Patented Feb. 6, 1940

2,189,383

UNITED STATES PATENT OFFICE 2,189,383

FACILITATING FRIEDEL-CRAFTS REACTIONS

Anderson W. Ralston and Robert J. Vander Wal, Chicago, Ill., assignors to Armour and Company, Chicago, Ill., a corporation of Illinois No Drawing. Application February 13, 1939, Serial No. 256,203

6 Claims. (Cl. 260—684)

This invention relates to facilitating Friedel-Crafts reactions and it comprises processes wherein the intermediate metallic chloride-containing Friedel-Crafts reaction product is subjected to hydrolysis in the presence of so-called "surface-active agents", also defined as wetting agents.

One of the well-known forms of the Friedel-Crafts reaction consists in reacting an aromatic hydrocarbon with an aliphatic acid chloride in the presence of a metal chloride, usually aluminum chloride, and in the presence of a solvent. This reaction, referred to as acylation, yields first, as an intermediate product, a complex metal chloride-containing compound which must thereafter be subjected to hydrolysis with steam, acids, or alkalis, before the final, catalyst-free, acylation product is obtained.

The established mechanism of a Friedel-Crafts acylation reaction can be illustrated as follows, RCOCl being an aliphatic acid chloride.

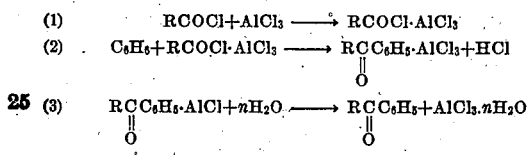

In the above reaction we have used benzene for purposes of illustration but, of course, many other aromatic hydrocarbons and substituted hydrocarbons are customarily used depending upon the alkyl-aryl ketone, or acylated hydrocarbon, finally desired.

It has been well established that the reaction product of reaction (2) given above is a complex formed by the union of the metal chloride and ketone since such complex intermediate products have been isolated as such. At the conclusion of reaction (2) the customary procedure is to subject the reaction mixture to hydrolysis as with steam, solutions of hydrochloric or other acids, and the like. The prior art contains many examples of the hydrolysis of such intermediate complex compounds.

However, it has been the common experience that in numerous cases the aluminum chloride complex formed by Equation 2, cannot be hydrolyzed, or can only be hydrolyzed with great difficulty. In the discussion which follows, it will be understood that aluminum chloride is given merely as an example since other metal chlorides have also been used as catalysts in the Friedel-Crafts acylation reaction, forming intermediate complex compounds which are likewise hydrolyzed only with great difficulty if at all.

At the conclusion of reaction (2) above the system contains the aluminum chloride complex, solvent, usually carbon disulfide, chlorobenzene, or like inert materials, and traces of water. In the customary hydrolysis step this mixture is poured on ice and then subjected to steam distillation to remove the solvent. In some cases the complex reaction product hydrolyzes without difficulty at this stage whereupon the desired ketone, freed of catalysts, separates out as an oily layer.

But in still other instances the complex reaction product does not hydrolyze and when this condition is encountered the entire reaction product must be discarded.

Hitherto no one has understood why one reaction product will not hydrolyze and another will, and this uncertainty of results has mitigated against great commercial use of the Friedel-Crafts reaction. Although used widely, the Friedel-Crafts process would have greatly enlarged utility if it could be made to work under all conditions and with all aliphatic and aromatic reactants susceptible to the reaction. The great stumbling block has been the hydrolysis of the intermediate reaction product which reaction takes the course shown in (3) above.

We ourselves have discarded numerous Friedel-Crafts intermediate reaction products because of our inability to hydrolyze the aluminum chloride complex.

We have now discovered the reason why these metal complexes fail to hydrolyze, and, as a result of such discovery, we have learned how this difficulty can be overcome.

Our invention is based upon the discovery that the reason why so many metal chloride complexes fail to hydrolyze is because they are not wetted by the hydrolyzing medium. It may possibly be due to the molecular configuration of the metal chloride complex, it may possibly be due to the nature of one or both of the reacting organic constituents. But the fact remains that any metal chloride complex could be hydrolyzed provided it was actually wetted by the hydrolyzing medium. And as a solution to this problem, we have discovered that the addition of every small amounts of surface-active agents, or wetting agents, to the hydrolyzing medium, or to the reaction product resulting from reaction (2) above, brings about rapid and complete hydrolysis. Metal chloride complexes which have hitherto failed to hydrolyze with the most drastic treatment ordinarily used, can be hydrolyzed in a few minutes when a surface-active agent is added.

In broad aspects then, our invention consists in incorporating in the system containing the metal chloride complex very small amounts of surface-active agents, referred to in the art also as wetting agents. There are a vast number of surface-active agents which we can use. Among them are amine salts, such as dodecyl amine acetate, and other primary and secondary aliphatic amine salts, many tertiary amines which hydrolyze to yield complex surface-active ions, the various sulfonated and sulfated aromatic and aliphatic hydrocarbons, alcohols, esters and oils, and the like.

For example, we can use an alkyl-aryl sulfonate known under the trade name of "Aerosol OS", another one known as "Alphasol OT", "Arylene" which is a sulfonated aromatic compound, water-soluble sulfonated mineral oils, fatty alcohol sulfates, the sodium salts of sulfonated lauryl and myristyl alcohols, and a great many other substances well known in the art and sold for purposes of reducing the surface tension between water and the material to be treated with the water.

In consequence, our invention is of broad scope with respect to the substances we use as wetting agents, and we do not wish to be limited to any particular compound. Our invention is also of broad scope with respect to the Friedel-Crafts complex metal chloride reaction products treated. Any of them which are difficultly hydrolyzed are amenable to our process. We can even use our wetting agents in connection with the hydrolysis of metal chloride intermediate complexes which hydrolyze normally and we are not to be limited to any particular metal chloride complex.

The following examples will illustrate our invention.

Example 1

A Friedel-Crafts reaction was performed between 150 grams of stearyl chloride and 150 cc. of a coumarone fraction in the presence of 80 grams of aluminum chloride. 125 cc. of chlorobenzene was used as a solvent. After the completion of the Friedel-Crafts condensation the reaction mixture was poured upon ice. It was then subjected to steam distillation, and most of the solvent was removed. The complex, however, would not hydrolyze and formed a milky suspension which still contained appreciable quantities of the aluminum. This process should have resulted in the "oiling out" of the ketone and the formation of a clear water layer. Several hours treatment with stearic acid and the addition of more hydrochloric acid failed to hydrolyze the complex. Approximately one gram of dodecyl amine acetate was then added and the mixture was completely hydrolyzed within three minutes. The entire mixture broke within this length of time giving a clear water solution with the ketone floating upon it.

Example 2

An unhydrolyzable reaction mixture similar to that described in Example 1 was treated with one gram of an alkyl-aryl sulfonate known commercially as (Alphasol OT). The mixture hydrolyzed after fifteen minutes to give a clear oil layer and a water layer.

Example 3

One hundred and forty-six grams of aluminum chloride was added over a period of one hour and forty minutes to a mixture of 170 grams of diphenyl ether, 300 grams of stearyl chloride and 500 cc. of chlorobenzene. The temperature ranged from 28° C. to 37° C. during the addition of the aluminum chloride. Upon completion of the addition the mixture was heated at 65–70° C. for one hour. The mixture was then poured onto ice, and steam distilled until most of the solvent had been removed. The metal complex failed to hydrolyze after several hours' treatment with hydrochloric acid. One gram of dodecyl amine acetate was added to the mixture and it hydrolyzed in several minutes. The oil and water layer separated. After removal of the remainder of the solvent from the oil layer by steam distillation the product was washed with water. Analysis showed it to be phenoxyphenyl heptadecyl ketone.

Example 4

A Friedel-Crafts product similar to that described in Example 3 was prepared. The complex was not hydrolyzed by several hours treatment with steam and hydrochloric acid. The mixture was then treated with one gram of $C_{17}H_{33}CONHC_2H_4SO_3Na$ (Igepon I) and the hydrolysis completed in several minutes.

Example 5

An unhydrolyzable Friedel-Crafts reaction product similar to that described under Example 3 was treated with a small amount of an alkylated-aryl sulfonate, (Santomerse). The hydrolysis was then completed in about fifteen minutes.

Example 6

An unhydrolyzable Friedel-Crafts reaction product similar to that described under Example 3 was treated with a small amount of an alkyl-aryl sulfonate (Alphasol OT). The hydrolysis was completed several minutes after this addition.

Example 7

An unhydrolyzable Friedel-Crafts reaction product similar to that described under Example 3 was treated with a small amount of a sodium alkyl-aryl sulfonate (Nacconal N. R.). The hydrolysis was completed several minutes after this addition.

Example 8

An unhydrolyzable Friedel-Crafts reaction product similar to that described under Example 3 was treated with a small amount of sodium lauryl sulfate. The hydrolysis was completed several minutes after this addition.

Example 9

An unhydrolyzable Friedel-Crafts reaction product similar to that described under Example 3 was treated with a small amount of a higher secondary alcohol sulfate (Tergitol). The hydrolysis was completed several minutes after this addition.

All surface-active agents are effective so far as we know, and we have investigated a great many of them. Some are more active than others in point of time, but they all speed up the hydrolysis rate enormously.

Having thus described our invention, what we claim is:

1. In the hydrolysis of metal chloride-containing Friedel-Crafts intermediate products, the step which comprises hydrolyzing such products in the presence of a surface-active agent.

2. The process as in claim 1 wherein the surface-active agent is an aliphatic amine salt.

3. The process as in claim 1 wherein the surface-active agent is a sulfonated organic compound having surface-active properties.

4. In the process of hydrolyzing metal chloride-containing Friedel-Crafts intermediate products, the steps which comprise adding a surface-active agent to the reaction mixture containing said intermediate product, and then subjecting the mixture to the step of hydrolysis.

5. The process as in claim 4 wherein the surface-active agent is an aliphatic amine salt.

6. The process as in claim 4 wherein the surface-active agent is a sulfonated organic compound having surface-active properties.

ANDERSON W. RALSTON.
ROBERT J. VANDER WAL.